United States Patent
Goupil et al.

(10) Patent No.: US 8,755,956 B2
(45) Date of Patent: Jun. 17, 2014

(54) METHOD AND DEVICE FOR DETECTING THE JAMMING OF AN AIRCRAFT CONTROL SURFACE

(71) Applicants: Philippe Goupil, Beaupuy (FR); Rémy Dayre, Pibrac (FR); Hervé Le Berre, Leguevin (FR); Anca Gheorghe, Bordeaux (FR); Ali Zolghadri, Leognan (FR); Jérôme Cieslak, Talence (FR); David Henry, Saint Aubin de Medoc (FR)

(72) Inventors: Philippe Goupil, Beaupuy (FR); Rémy Dayre, Pibrac (FR); Hervé Le Berre, Leguevin (FR); Anca Gheorghe, Bordeaux (FR); Ali Zolghadri, Leognan (FR); Jérôme Cieslak, Talence (FR); David Henry, Saint Aubin de Medoc (FR)

(73) Assignees: Airbus Operations S.A.S., Toulouse (FR); Universite Bordeaux 1, Talence Cedex (FR); Centre National de la Recherche Scientifique, Paris (FR)

( * ) Notice: Subject to any disclaimer, the term of this patent is extended or adjusted under 35 U.S.C. 154(b) by 0 days.

(21) Appl. No.: 13/671,964

(22) Filed: Nov. 8, 2012

(65) Prior Publication Data

US 2013/0116863 A1   May 9, 2013

(30) Foreign Application Priority Data

Nov. 8, 2011  (FR) ...................................... 11 60156

(51) Int. Cl.
- G05D 3/00   (2006.01)
- G05D 3/12   (2006.01)
- G05D 1/00   (2006.01)
- G01C 23/00  (2006.01)

(52) U.S. Cl.
CPC .. *G05D 3/12* (2013.01); *G05D 1/00* (2013.01); *G01C 23/00* (2013.01)
USPC ................ 701/14; 701/3; 244/75.1; 244/99.9

(58) Field of Classification Search
USPC .............. 701/42, 3–18, 29.7–31.1, 33.8, 120; 244/75.1–237; 318/563–566; 307/80, 307/85–87; 700/33
See application file for complete search history.

(56) References Cited

U.S. PATENT DOCUMENTS

| | | | |
|---|---|---|---|
| 4,130,241 A * | 12/1978 | Meredith et al. | 714/10 |
| 4,148,452 A * | 4/1979 | Niessen et al. | 244/195 |
| 4,472,780 A * | 9/1984 | Chenoweth et al. | 701/4 |
| 4,649,484 A * | 3/1987 | Herzog et al. | 701/3 |
| 5,274,554 A * | 12/1993 | Takats et al. | 701/29.2 |
| 5,615,119 A * | 3/1997 | Vos | 701/4 |
| 5,819,188 A * | 10/1998 | Vos | 701/4 |
| 6,085,127 A * | 7/2000 | Vos | 701/4 |
| 6,389,335 B1 * | 5/2002 | Vos | 701/4 |
| 7,098,619 B2 * | 8/2006 | Stridsberg | 318/563 |
| 7,451,021 B2 * | 11/2008 | Wilson | 701/9 |
| 7,567,862 B2 * | 7/2009 | Pelton et al. | 701/33.8 |

(Continued)

*Primary Examiner* — Thomas Tarcza
*Assistant Examiner* — Tyler J Lee
(74) *Attorney, Agent, or Firm* — Ingrassia Fisher & Lorenz P.C.

(57) ABSTRACT

The detection device includes, but is not limited to a device that is configured to determine a control error corresponding to the difference between a first control instruction and a control surface position, a second device that is configured to calculate the difference between this control error and a second control instruction in such a way as to form a comparison signal, and a third device that is configured to detect a jamming of the control surface if this comparison signal is greater than a threshold value.

18 Claims, 2 Drawing Sheets

(56) References Cited

U.S. PATENT DOCUMENTS

| | | | |
|---|---|---|---|
| 2007/0109745 A1* | 5/2007 | Yeh | 361/695 |
| 2009/0048689 A1* | 2/2009 | Pelton et al. | 700/33 |
| 2010/0145555 A1* | 6/2010 | Hagerott et al. | 701/3 |
| 2012/0101794 A1* | 4/2012 | Gojny et al. | 703/8 |

* cited by examiner

METHOD AND DEVICE FOR DETECTING THE JAMMING OF AN AIRCRAFT CONTROL SURFACE

CROSS-REFERENCE TO RELATED APPLICATION

This application claims priority to French Patent Application No. 11 60156, filed Nov. 8, 2011, which is incorporated herein by reference in its entirety.

TECHNICAL FIELD

The technical field relates to a method and a device for detecting a jamming of an aircraft control surface, the position of which is controlled by a feedback control loop, and an electrical flight control system comprising a detection device of this type.

BACKGROUND

The embodiments apply to a feedback control loop, which is intended to control the position of all types of aircraft control surface, such as ailerons, spoilers or an elevator. For example, which forms part of an electrical flight control system of the aircraft, and which comprises said control surface which is mobile, and of which the position in relation to the aircraft is adjusted by at least one actuator, said actuator which adjusts the position of said control surface according to at least one received actuation instruction, at least one sensor which measures the actual position of said control surface, and a (flight control) computer which produces a control surface actuation instruction, transmitted to said actuator, on the basis of said measured actual position and a control instruction calculated on the basis of the action of the pilot on a control stick or the action of the autopilot and the inertial state of the aircraft.

It is known that flight control computers perform, inter alia, the position control of the control surfaces of an aircraft, for example a transport aircraft. The movement of the control surface is generated by an actuator which may be either in active mode or in passive mode. Two actuators are generally provided for each control surface. A computer, referred to as the "master" computer, performs the control by sending a control instruction to the active actuator. The other actuator, associated with a second computer, referred to as the "slave" computer, is forced into passive mode to follow the movement of the control surface. If the master computer detects a fault via specific monitoring means, it switches the active actuator to passive mode, and hands over control to the slave computer which controls the second actuator (then switched to active mode).

The jamming of a control surface, according to the point of flight of the aircraft, may have consequences for the guidance of said aircraft, for the dimensioning of its structure due to the loads generated, and for its performance (non-compliance with ETOPS regulations, for example). It is therefore necessary to be able to detect a fault of this type sufficiently quickly before the consequences in the aircraft are too significant, in particular in order to be able to alert the crew so that it can carry out actions limiting the consequences of this fault. In the context of the description, the term "jamming" of a control surface is understood to mean the situation of a control surface which remains fixed in its current position (when varying control instructions are applied).

In view of the foregoing, at least one object is to overcome the aforementioned disadvantages. In addition, it is at least another object to provide a method, which is particularly robust and which is applicable to any type of aircraft with electrical flight control, for detecting at least a jamming of a control surface of the aircraft, the position of which is controlled by a feedback control loop, the method allowing such a jamming to be detected, regardless of its origin, at levels sufficiently low to avoid adverse consequences in the aircraft, and within a short space of time. In addition, other objects, desirable features and characteristics will become apparent from the subsequent summary and detailed description, and the appended claims, taken in conjunction with the accompanying drawings and this background.

SUMMARY

A method is provided for detecting a jamming of a control surface, the position of which is controlled by a feedback loop forming part of an electrical flight control system of the aircraft, which comprises said control surface which is mobile, and of which the position in relation to the aircraft is adjusted by at least one actuator, said actuator which adjusts the position of said control surface according to at least one actuation instruction received in the form of a control command; at least one sensor which measures the actual position of said control surface; and at least one computer which produces a control surface control instruction, which receives said measured actual position and which deduces from it an actuation instruction which is transmitted to said actuator in the form of a control command.

It is noteworthy in that the following sequence of successive steps is carried out in an automatic and repetitive manner. A control error corresponding to the difference between a first control instruction of the control surface and a corresponding control surface position is determined, the difference between the absolute value of this control error (determined in step a)) and the absolute value of a second control instruction of the control surface in such a way as to form a comparison signal. This comparison signal is compared with a threshold value and a jamming of said control surface is detected if this comparison signal is greater than a threshold value during at least a confirmation period.

Thus, through the comparison of the control error, as an absolute value, with the absolute value of the control instruction, for example, the pilot instruction interpreted by the attitude control laws, a jamming of the control surface can be detected when it occurs. More particularly, it is possible to detect, in the monitored feedback control loop, as described above, and in a short space of time, any jamming of a controlled control surface, regardless of the origin of the fault, at levels sufficiently low to avoid adverse consequences in the aircraft. The method therefore allows minor jamming to be detected and therefore the controllability of the aircraft and its performance to be improved and the structural loads to be reduced in the event of a fault, with no penalty in terms of weight and cost, notably no additional sensor is necessary.

In the context of the embodiment, the comparison signal can be formed using any control instruction information, for the first and/or the second control instructions, and any corresponding control surface position information (i.e., relative to the same time), which is available in the flight control system. Thus, the information can be implemented in a varied manner. Moreover, said first and second control instructions, one of which is used to calculate the control error, and the other of which is shielded from this control error, can represent the same control instruction or two control instructions obtained in different ways.

Moreover, in particular with a double-channel structure COM/MON for the flight control computers with a control unit COM (COMmand) and a monitoring unit MON (MONitor) in a computer, a control instruction can be calculated in each channel: an instruction COM and an instruction MON are then provided. Two position information elements can also be provided, one supplied by a conventional LVDT sensor and one measured by a conventional RVDT sensor.

In an embodiment, it is possible to use for a measured position of said position of the control surface position, in particular on an adjacent actuator, or a calculated position, and notably a redundant position in the monitored actuator or a position estimated on the basis of a behavioral model of the control surface coupled to the at least one actuator. Moreover, in one particular embodiment, in determining the control error corresponding to the difference between a first control instruction of the control surface and a corresponding control surface position, said control error E is calculated using the following expression:

$$E=|i_{sv}/K|$$

where:

$i_{sv}$ represents the control current applied to the at least one actuator; and K represents a control gain.

In one particular embodiment, in determining the control error corresponding to the difference between a first control instruction of the control surface and a corresponding control surface position, at least one of the following parameters is advantageously limited: said control surface position, said first control instruction, said second control instruction, thereby allowing the monitoring to be made robust. Moreover, in an advantageous manner, the threshold value and the confirmation period used in the processing may be: either fixed and predetermined, or variable, according to particular conditions specified below. Moreover, it is advantageously checked whether particular activation conditions, depending on the architecture of the system and the characteristics of the monitored actuator, are satisfied, and said the foregoing method steps are carried out only if, and as soon as, these activation conditions are satisfied.

Moreover, in one embodiment, before said first control instruction is used in determining the control error corresponding to the difference between a first control instruction of the control surface and a corresponding control surface position, an auxiliary step is carried out, during which said first control instruction is filtered using a filter which models the behavior of the at least one actuator and the control loop. In this case, a second-order discrete linear filter is advantageously used, the adjustment parameters of which are optimized to improve the response and stability of said filter.

Preferably, in the event of detection of a jamming of said control surface if this comparison signal is greater than a threshold value during at least a confirmation period, said actuator is automatically switched to a passive mode and an auxiliary actuator, which is also intended for the control of the control surface concerned and which was previously in a passive mode, is automatically switched to an active mode, in which its function is then to adjust the position of said control surface, instead of said actuator. Advantageously, in the case of a control surface likely to be controlled by a plurality of actuators, a jamming of the control surface is confirmed if a jamming has been detected for a predetermined number of said actuators, i.e., for the two actuators (e.g., main and auxiliary) in the preceding example. This allows the jamming of a control surface to be distinguished from a docking of the latter. Moreover, in the event of detection of a jamming of said control surface if this comparison signal is greater than a threshold value during at least a confirmation period, a visual and/or audible warning is preferably transmitted into the cockpit in order to alert the crew to the fault and allow it to perform actions limiting the consequences of this fault.

In accordance with another embodiment, a device is also provided for detecting at least one jamming of a control surface (e.g., aileron, spoiler, elevator, and rudder) of an aircraft, the position of which is controlled by a feedback control loop of the aforementioned type. The detection device is noteworthy in that it comprises—an first device to determine a control error corresponding to the difference between a first control instruction of the control surface and a corresponding control surface position, a second device to calculate the difference between the absolute value of said control error and the absolute value of a second control instruction of the control surface in such a way as to form a comparison signal, a third device to compare this comparison signal with a threshold value; and a fourth device to a detect a jamming of said control surface if this comparison signal is greater than a threshold value during at least a confirmation period.

The at least one actuator which adjusts the position of said control surface may be a hydraulic actuator or an electrically powered actuator. Moreover, an electrically powered actuator may correspond to an Electro-Hydrostatic Actuator (EHA) or an Electro-Mechanical Actuator (EMA). It may also be an Electrical Backup Hydraulic Actuator (EBHA), when it operates in electrical mode. The detection device thus allows any jamming of a control surface of an aircraft to be detected automatically and quickly. In an advantageous manner, it allows all the cases of jamming likely to adversely affect an actuator to be covered.

The embodiments also relate to an electrical flight control system of an aircraft, comprising at least one conventional device (comprising, for example, a control stick) to produce a control surface control instruction for at least one control surface of the aircraft, and at least one position feedback control loop of this control surface, of the aforementioned type. According to an embodiment, this electrical flight control system is noteworthy in that it furthermore comprises at least one detection device, as previously described.

The embodiment furthermore relates to an aircraft, in particular a transport aircraft, which is provided with an electrical flight control system of this type.

BRIEF DESCRIPTION OF THE DRAWINGS

The detailed description will hereinafter be described in conjunction with the following drawing figures, wherein like numerals denote like elements.

DETAILED DESCRIPTION

The following detailed description of the invention is merely exemplary in nature and is not intended to limit application and uses. Furthermore, there is no intention to be bound by any theory presented in the preceding background or summary or the following detailed description.

Figure 1:
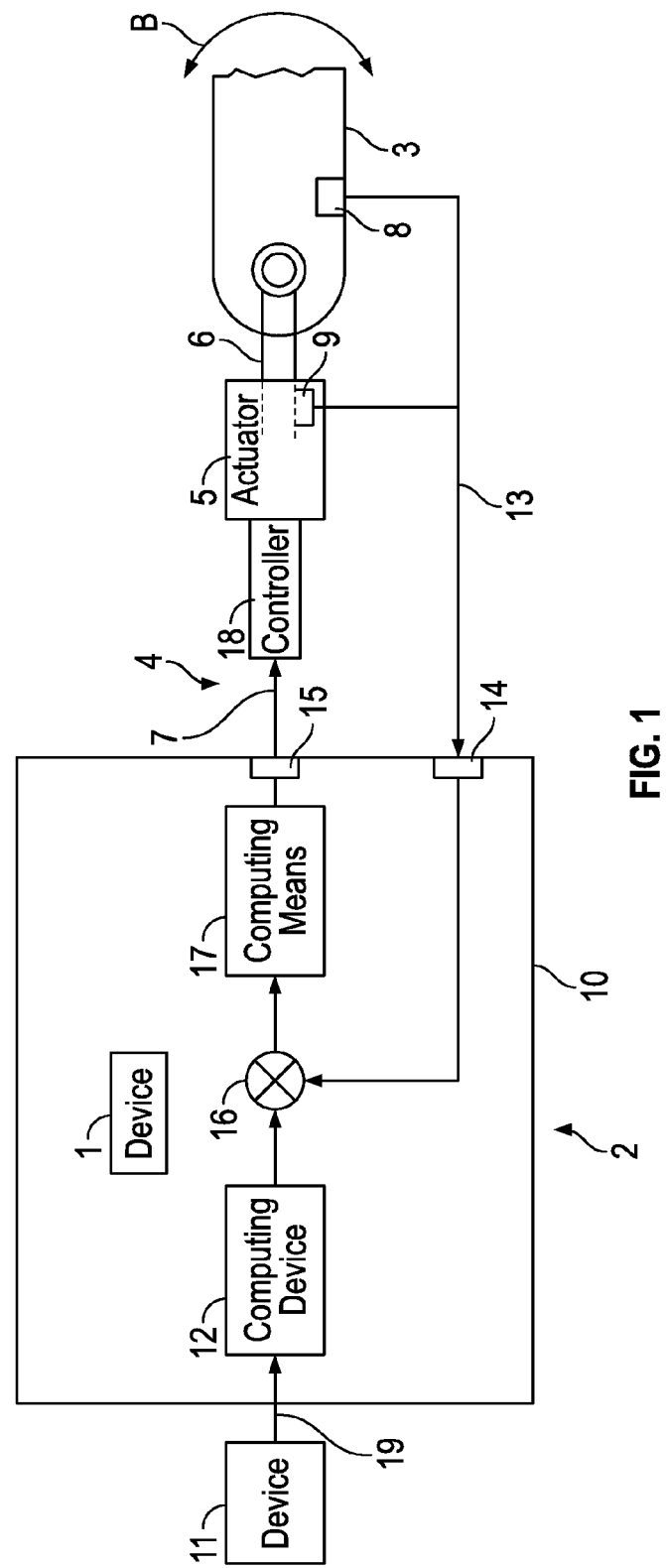
FIG. 1 shows schematically a position feedback control loop of an aircraft control surface, which comprises a detection device according to an embodiment.

The device 1 is intended to detect a jamming of a control surface 3 (e.g., aileron, spoiler, elevator, rudder) of an aircraft, in particular of a transport aircraft, the position of which is controlled by a feedback control loop 2, which is shown in FIG. 1). This feedback control loop 2 forms part of an electrical flight control system 4 of the aircraft (not shown) and comprises a control surface 3, which is mobile, being likely to be directed as shown by a double arrow B in FIG. 1, and the position of which in relation to the structure of the aircraft is adjusted by at least one conventional actuator 5, which adjusts the position of the control surface 3, for example via a bar 6 which acts on the latter, according to at least one actuation instruction received via a link 7. The feedback control loop 2 further comprises at least one sensor 8, 9 that measures the actual position of the control surface 3. For this purpose, it may entail a sensor 8 that is directly associated with the control surface 3 and/or a sensor 9, which measures, for example, the movement of the bar 6 of the at least one actuator 5, and a computer 10, for example a flight control computer. The flight control computer receives control information from device 11 via a link 19. These device 11 generates control information in a convention manner and comprises, for example, a control stick that is likely to be actuated by a pilot of the aircraft and inertial sensors, which generates a control surface control instruction in a conventional manner using an integrated computing device 12 that contains attitude control laws and uses control information for this generation, for example the action of the pilot on the control stick, parameters that indicate the position of the aircraft around its center of gravity, factors relating to the load to which it is subjected, received from the device 11, which receives the actual position measured by the sensor(s) 8 and 9 via a link 13, via an analog or digital input 14, which calculates, on the basis of the preceding information (e.g., control surface control instruction and measured actual position), the actuation instruction using an integrated computing means 17 taking account of a predetermined gain, and transmits this actuation instruction, in the form of a control command, to a controller 18, for example a servo valve or an electric motor, of the at least one actuator 5 via the link 7, via an analog or digital output 15.

Figure 2:
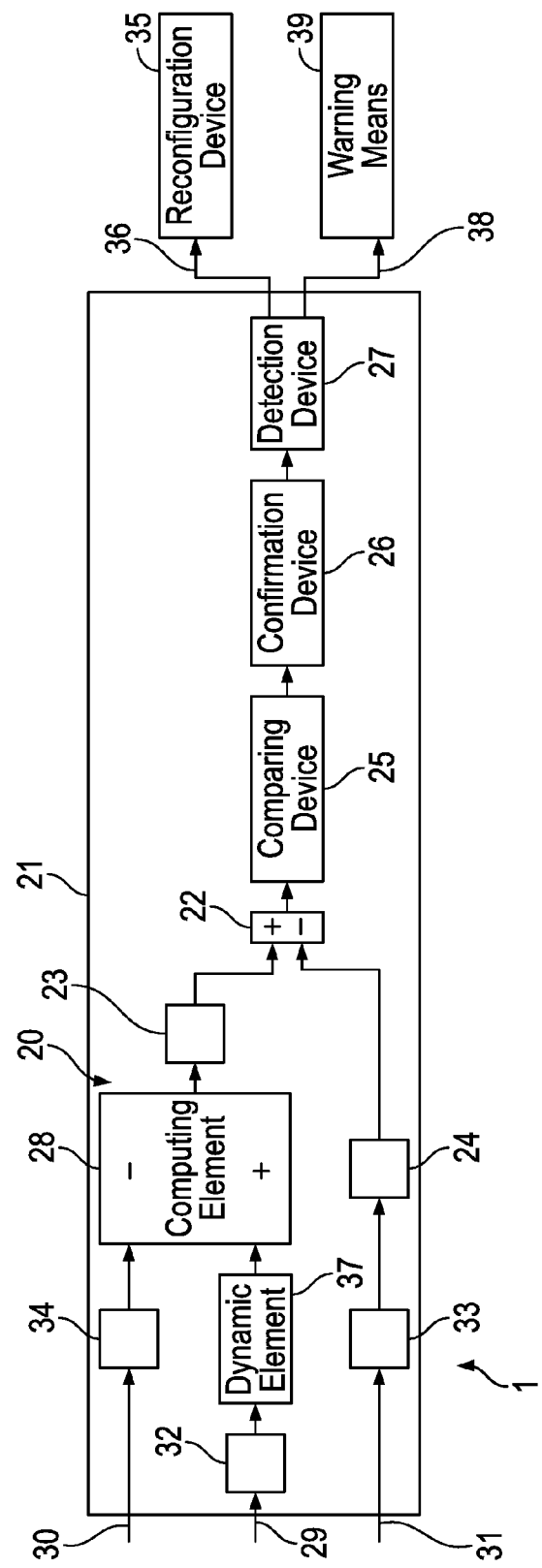
FIG. 2 is the synoptic diagram of a detection device according to an embodiment.

The electrical flight control system 4 comprises, in addition to the feedback control loop 2, the device 1 that is intended to detect at least one jamming of the control surface 3, regardless of the origin of the fault. The device 1 comprises, as shown in FIG. 2, a processing unit 21 which includes a device 20 to determine a control error E corresponding to the difference between a first control instruction of the control surface 3 and a corresponding control surface position, a device 22 to calculate the difference between: on the one hand, the absolute value, determined by a device 23, of this control value; and on the other hand, the absolute value, determined by a device 24, of a second control instruction of the control surface 3, in such a way as to form a comparison signal ϵ; The detection device also comprises a device 25 to compare this comparison signal ϵ to a threshold value λ specified below, this device 25 associated with a confirmation device 26 and a device 27 to detect a jamming of the control surface 3 if this comparison signal ϵ is greater than the threshold value λ (device 25) during at least a confirmation period (Tc) (device 26).

Consequently, the device 1 is capable of very quickly detecting, in the feedback control loop 2, any jamming of the control surface 3, regardless of the origin of the fault, at levels sufficiently low to avoid adverse consequences in the aircraft. The device 1 therefore allows minor jamming to be detected, and therefore allows the controllability of the aircraft and its performance to be improved, and the structural loads to be reduced in the event of a fault, with no penalty in terms of weight and cost, notably no additional sensor is necessary.

In accordance with an embodiment, the at least one actuator 5, which adjusts the position of said control surface 3, may be a hydraulic actuator or an electrically powered actuator (i.e., an actuator which uses electrical power to operate). An electrically powered actuator may correspond to an Electro-Hydrostatic Actuator (EHA) or an Electro-Mechanical Actuator (EMA). It may also be an Electrical Backup Hydraulic Actuator (EBHA), when it operates in electrical mode. An EBHA is a hybrid actuator comprising the characteristics of both a conventional hydraulic servo control and an EHA. In a normal situation (without fault), the EBHA operates as a conventional servo control. Conversely, in the event of a fault adversely affecting the hydraulic mode, this EBHA switches to electrical mode and operates as an EHA.

In accordance with an embodiment, the comparison signal ϵ can be formed using any control instruction information and any corresponding information relating to the control surface position (i.e., relating to the same time), which is available in the flight control system 4. This allows a varied implementation. Moreover, the first and second control instructions, one of which is used to calculate the control error, and the other of which is shielded from this control error, can represent the same control instruction or two control instructions obtained in different ways. In particular, with a double-channel structure COM/MON for the flight control computers, with a control unit COM (COMmand) and a monitoring unit MON (MONitor) in a computer, a control order can be calculated in each channel: A control instruction COM and a control instruction MON are then provided.

Moreover, the position of the control surface 3, which is used by the device 1, may, in particular, be a position available in a unit MON, generally the position of the control surface measured by an RVDT (Rotary Variable Differential Transducer) surface position sensor, or other position information which may be that of the bar 6 of the at least one actuator 5, supplied by an LVDT (Linear Variable Differential Transducer) bar elongation sensor, the position measured on an adjacent actuator (LVDT or RVDT), a redundant position in the monitored actuator 5 or position estimated on the basis of a behavioral model of the control surface 3 coupled to the at least one actuator 5.

Moreover, in one particular embodiment, (not shown), the device 20 calculates said control error E using the following expression:

$$E = |i_{sv}/K|$$

Where $i_{sv}$ represents the control current applied to the at least one actuator 5. The at least one actuator 5 may be equipped with a sensor located on the servo valve, for a conventional hydraulic servo control, which allows the control current (i.e., servo valve current ($i_{sv}$)) actually applied to the at least one actuator 5 to be measured, and K represents a control gain. The same principle can be applied in the case of an EHA or EMA, which does not contain a servo valve but an electronic module which transforms the instruction into a command to the electric motor.

In the particular embodiment in FIG. 2, the device 20 of the device 1 comprise a computing element 28 that calculates the difference between a first control instruction of the control surface, received by the device 1 via a link 29, and a corresponding control surface position, received by the device 1 via a link 30, to form the control error. The first control instruction received by the link 29 is generally limited, in speed and position, to maximum operational values, by device 32, in order to make the monitoring more robust.

For the same purpose, the second control instruction received via a link 31, which may be identical to or different from said first control instruction, is also generally limited, in speed and position, to maximum operational values by device 33). As for the position received via the link 30, it is generally limited in position by device 34 to maximum operational values.

The difference, calculated by the device 22, is then compared by the device 25, to a positive threshold value λ, for example approximately 10 mm, and a confirmation time Tc, for example approximately 2 seconds, is applied to the result via the device 26 before a locking or confirmation of the fault is carried out via the device 27. The pairs (i.e., threshold value λ/confirmation time Tc) are chosen in order, on the one hand, to be robust to both static and dynamic errors, and on the other hand, to allow the objectives assigned to the monitoring to be achieved. Moreover, a monitoring activation condition can be applied to the device 1. This condition depends closely on the state of the system and the monitored actuator 5: the at least one actuator 5 is in the active state, etc.

Once the fault has been detected and locked, the faulty actuator 5 is made passive, and a reconfiguration on the adjacent actuator which then becomes active is carried out by reconfiguration device 35 which are, for example, connected via a link 36 to the detection device 27. In fact, two actuators 5 are generally provided for each control surface 3. A computer, referred to as the "master" computer, which carries out the control by sending a control command to an actuator that is active. The other actuator, associated with a second computer, referred to as the "slave" computer, is forced into passive mode in order to follow the movement of the control surface 3. If the device 1 detects a fault, resulting in a jamming of the control surface 3, the device 35 switches the at least one actuator to passive mode and hand over control to the slave computer that controls the second actuator that has switched to active mode.

In an embodiment and in the event of detection of a jamming, the device 1 automatically carries out the aforementioned reconfiguration. Moreover, in the event of such a detection, the device 1 transmits a visual and/or audible warning signal into the aircraft cockpit via warning means 39, which are, for example, connected via a link 38 to the detection device 27, in order to alert the crew to the fault and allow it to carry out the actions limiting the consequences of this fault.

Moreover, in one preferred embodiment applied to a control surface 3 likely to be controlled by a plurality of actuators 5, a jamming of the control surface 3 is confirmed by a device (not shown) of the device 1, if a jamming has been successively detected, in the manner described above, for a predetermined number of said actuators 5 (i.e. for the two actuators, master and slave, in the preceding example. This allows the jamming of a control surface 3 to be distinguished from a docking of the latter.

In one embodiment, in order to improve the performance of the comparison signal ($\epsilon$), the monitoring carried out by the device 1 is complemented by the introduction of a dynamic element 37, between the device 32 and device 28 in FIG. 2), the role of which is to reduce the difference between the control signal and the position of the control surface 3. Knowing that the error between the position of the control surface 3 and the instruction is mainly linked to the error due to the response of the at least one actuator 5, the purpose of this dynamic element 37 is to reproduce the response of the at least one actuator 5 and the control loop as faithfully as possible.

Thus, the dynamic element 37 comprises a linear filter in order to model as faithfully as possible the behavior of the at least one actuator and the control group in normal and quasi-linear operation. As the consequence of the appearance of a jamming phenomenon is to draw the control loop outside its nominal operating area, this adversely affects the behavior of the residue thus generated. The free parameters of this filter are optimized on the basis of a set of data. One advantage of the proposed solution is that the initial structure of the monitoring, detailed above, is entirely preserved.

This dynamic element 37 corresponds to a discrete linear filter, the role of which is to model the dynamic behavior of the servo control loop in nominal operation (i.e., without jamming). The expression of this filter is given by:

$$F(z) = \frac{TK_1 + (z-1)K_2}{(z-1+K_2)(z-1) + K_1 T}$$

Where $F(z)$ is an LTI (Linear Time Invariant) discrete filter and comprises two free parameters ($K_1$ and $K_2$). The adjustment of these parameters determines the improvements made by this filter and notably the detection of the jammed control surfaces at the lowest possible levels.

The gain during constant operation of this filter is equal to one, regardless of the chosen pair ($K_1$, $K_2$). As the control loop has an input-output (instruction-position) gain approximately equal to one, the choice of the structure allows this a priori information to be integrated. This aspect is translated by the fact that the adjustment parameter optimization process has more of an effect on the minimization of the difference in the dynamic phases.

The process for adjusting these parameters is described below. It involves an optimization procedure, requiring a set of input-output (e.g., instruction and position) data. In the case of the jamming, the aim is to use the filter and to optimize its parameters so that it models as accurately as possible the response of the at least one actuator 5. Consequently, the difference between the output of the filter and the position of the control surface 3 should be minimized. The parameters of the filter are optimized to produce the position of the control surface 3 by placing the instruction of the pilot at the input.

The stability constraints are of the "linear inequality" type, deduced from the Jury criterion. A discrete linear filter is stable if its poles are all in the unit radius circle in the complex plane. The Jury criterion is an algebraic criterion which gives the conditions that are necessary and sufficient so that the roots of a polynomial have a coefficient strictly less than 1. The stability conditions are therefore deduced by applying this criterion to the denominator of the preceding equation to deduce the stability constraints indicated below.

This step serves to resolve a non-linear optimization problem under unequal linear constraints:

$$(\hat{K}_1, \hat{K}_2) = \arg\min_{K_1, K_2} \|M_0 - M(K_1, K_2)\|_t$$

Under stability constraints:

$$\begin{cases} K_1 > 0 \\ K_1 T - 2K_2 + 4 > 0 \\ K_1 T - K_2 + 2 > 0 \\ -K_1 T + K_2 > 0 \end{cases}$$

Where M and $M_0$ respectively represent the output signal of the filter and a reference signal l=1,2 correspond to the standard used.

This optimization is carried out using a "model matching" method. A "target" response of the filter ($M_0$) is chosen and the free parameters of the system ($K_1$ and $K_2$) are adjusted via an optimization process so that the response of the system M follows the response of the reference model as closely as possible. The square deviation (l=2) or amplitude deviation (l=1) between the target response and the real output of the filter is minimized, while remaining within the stability region.

The target response ($M_0$) represents the true response of the at least one actuator 5, obtained using the non-linear model of the at least one actuator 5, by placing the instruction of the pilot at the input. To obtain this response, the same instruction as the instruction used to obtain the real response of the filter is therefore placed at the input. The real response M is the output of the filter that has the instruction of the pilot as the input. Standard optimization techniques can be used to solve this problem. The output of this optimization process is the required pair ($\hat{K}_1$, $\hat{K}_2$). This pair of parameters is then encoded in the computer for the real-time monitoring.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A method for detecting a jamming of a control surface, a position of the control surface is controlled by a feedback loop that forms a part of an electrical flight control system of an aircraft, the feedback loop comprising:
    a plurality of actuators coupled to the control surface to adjust the position of the control surface in relation to the aircraft according to at least one actuation instruction received as a control command;
    at least one sensor configured to measure an actual position of said control surface; and
    at least one computer that is configured to produce a control surface control instruction, which receives said actual position and produces an actuation instruction that is transmitted to one of said plurality of actuators in a form of a control current,
    wherein the method comprises:
    receiving as input a first control instruction of the control surface from a device onboard the aircraft, the first control instruction limited to maximum operational values;
    filtering the first control instruction signal using a filter that models a behavior of the one of said plurality of actuators and the feedback loop;
    determining a control error corresponding to a difference between the filtered first control instruction of the control surface and a corresponding control surface position;
    forming a comparison signal with a difference between an absolute value of said control error and the absolute value of a second control instruction of the control surface, the second control instruction shielded from said control error;
    comparing the comparison signal with a threshold value; and
    detecting a jamming of said control surface if the comparison signal is greater than the threshold value during at least a confirmation period;
    reconfiguring a second one of the plurality of actuators to adjust the position of the control surface based on the detection of the jamming of the control surface.

2. The method as claimed in claim 1, wherein said control error E is calculated using the following expression:

$$E=|i_{sv}/K|$$

where:
$i_{sv}$ represents the control current applied to the at least one actuator; and
K represents a control gain.

3. The method as claimed in claim 1, wherein a measured position is used for said position of the control surface.

4. The method as claimed in claim 1, further comprising using a calculated position for said position of the control surface.

5. The method as claimed in claim 1, further comprising limiting said position of the control surface.

6. The method as claimed in claim 1, further comprising limiting and said second control instruction.

7. The method as claimed in claim 1, wherein the threshold value is a variable according to particular conditions.

8. The method as claimed in claim 1, further comprising starting after satisfying particular activation conditions.

9. The method as claimed in claim 1, wherein the filter is a second-order discrete linear filter, and adjustment parameters are optimized to improve a response and stability of said filter.

10. The method as claimed in claim 1, wherein, switching the at least one actuator to a passive mode, and switching an auxiliary actuator previously in the passive mode to an active mode with a function to adjust the position of said control surface if the jamming is detected.

11. The method as claimed in claim 1, wherein for the control surface to be controlled by a plurality of actuators, confirming a jamming of the control surface if a jamming is detected for a predetermined number of said plurality of actuators.

12. The method as claimed in claim 1, further comprising transmitting an alarm if the jamming is detected.

13. A device for detecting a jamming of a control surface of an aircraft,
    a feedback loop forming a part of an electrical flight control system of the aircraft, comprising:
        a plurality of actuators coupled to the control surface to adjust a position of the control surface in relation to the aircraft and one of the plurality of actuators configured to adjust the position of the control surface according to at least one actuation instruction received from a device onboard the aircraft as a control command;
        at least one sensor configured to measure an actual position of said control surface; and
        a computer that is configured to produce a control surface control instruction, which receives said actual position and which deduces an actuation instruction that is transmitted to the one of the plurality of actuators as a control current;
    a filter that filters a first control instruction for the control surface based on a behavior of the one of the plurality of actuators and the feedback loop;
    a first device that determines a control error corresponding to a difference between the filtered first control instruction of the control surface and a corresponding control surface position;
    a second device that calculates a difference between an absolute value of said control error and the absolute value of a second control instruction of the control surface in such a way as to form a comparison signal, the second control instruction shielded from said control error;

a third device that compares the comparison signal with a threshold value;

a fourth device that detects a jamming of said control surface if the comparison signal is greater than the threshold value during at least a confirmation period; and a fifth device that reconfigures a second one of the plurality of actuators to adjust the position of the control surface based on the detection of the jamming of the control surface.

14. The device as claimed in claim 13, wherein said control error E is calculated using the following expression:

$$E=|i_{sv}/K|$$

where:

$i_{sv}$ represents the control current applied to the at least one actuator; and K represents a control gain.

15. The device as claimed in claim 13, wherein the threshold value is a variable according to particular conditions.

16. The device as claimed in claim 13, further comprising an alarm that is configured to activate if the jamming is detected.

17. An electrical flight control system of an aircraft, comprising:

at least device that is configured to produce a control surface control instruction for a mobile control surface of the aircraft and at least one feedback control loop to control a position of this control surface, comprising:

a plurality of actuators coupled to the mobile control surface and one of the plurality of actuators adjusts the position of said mobile control surface in relation to the aircraft according to at least one actuation instruction received from a device onboard the aircraft;

at least one sensor that is configured to measure an actual position of said control surface; and a computer that is configured to produce said control surface control instruction, which receives said actual position and which deduces an actuation instruction that is transmitted to the one of the plurality of actuators; and a detection device, the detection device comprising;

a filter that filters a first control instruction for the mobile control surface based on a behavior of the one of the plurality of actuators and the at least one feedback control loop;

a first device that determines a control error corresponding to a difference between the filtered first control instruction of the control surface and a corresponding control surface position;

a second device that calculates a difference between an absolute value of said control error and the absolute value of a second control instruction of the control surface in such a way as to form a comparison signal, the second control instruction shielded from the control error;

a third device that compares the comparison signal with a threshold value;

a fourth device that detects a jamming of said control surface if the comparison signal is greater than the threshold value during at least a confirmation period; and a fifth device that reconfigures a second one of the plurality of actuators to adjust the position of the control surface based on the detection of the jamming of the control surface.

18. The electrical flight control system as claimed in claim 17, wherein said control error E is calculated using the following expression:

$$E=|i_{sv}/K|$$

where:

$i_{sv}$ represents a control current applied to the at least one actuator; and

K represents a control gain.

* * * * *